United States Patent [19]

McMaster

[11] Patent Number: 4,769,058
[45] Date of Patent: Sep. 6, 1988

[54] METHOD OF MAKING A SMOOTH SILICA GLASS BODY

[75] Inventor: Harold A. McMaster, Woodville, Ohio

[73] Assignee: Glasstech, Inc., Perrysburg, Ohio

[21] Appl. No.: 95,842

[22] Filed: Sep. 14, 1987

[51] Int. Cl.⁴ .............................................. C03B 18/02
[52] U.S. Cl. ...................................... 65/104; 65/99.2; 65/30.12; 65/113; 65/900
[58] Field of Search ............ 65/30.12, 23, 99.2, 65/104, 113, 900

[56] References Cited

U.S. PATENT DOCUMENTS

| | | | |
|---|---|---|---|
| 3,915,720 | 10/1975 | Tarcza | 65/30.12 X |
| 4,046,545 | 9/1977 | Sanford et al. | 65/30.12 |
| 4,380,463 | 4/1983 | Matesa | 65/99.2 |
| 4,462,816 | 7/1984 | Wolfe et al. | 65/23 |

Primary Examiner—Arthur Kellogg
Attorney, Agent, or Firm—Brooks & Kushman

[57] ABSTRACT

Silica glass having a substantially smooth, planar surface is formed by floating sintered silica glass on a molten metallic bath. The molten metallic bath is maintained at a sufficiently high temperature to heat-polish the sintered silica glass surface which is in thermal contact with the bath to form a substantially smooth, planar surface. A method for producing silica glass includes floating sintered silica glass on a molten metallic bath to provide the sintered glass with a substantially smooth surface. The resultant silica glass has many applications, but has particular utility for semiconductor substrates, integrated circuit masks, and other electronic applications.

3 Claims, 1 Drawing Sheet

METHOD OF MAKING A SMOOTH SILICA GLASS BODY

TECHNICAL FIELD

This invention relates to high purity, dried metallic oxide glass bodies.

BACKGROUND ART

Sol-gel processing of metallic oxide glasses has recently become the subject of intense research because of its interesting applications. When compared to more conventional processing, the inherent advantages of sol-gel processing include chemical homogeneity on a molecular scale, high purity, and the ability to conveniently shape articles by the use of low temperature casting methods. The term "sol-gel" is an abbreviation of the phrase "solution-gelation". In general reference, the term sol refers to a mixture of solid colloidal particles in a liquid solvent. Brownian motion keeps the colloidal sols from settling, while surface charges aid in the dispersion of the particles within the solvent. However, in the glass field, sol-gel has a broader meaning because it includes the use of organometallics such as metallic alkoxides which are partially hydrolyzed and then polymerized into a uniform gel. During the processing steps, there are major distinctions between polymerized alkoxides and colloidal sols.

While colloidal sols are prepared by precipitation and peptization, polymerized alkoxides are partially hydrolyzed,

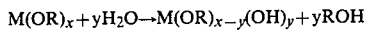

$$M(OR)_x + yH_2O \rightarrow M(OR)_{x-y}(OH)_y + yROH$$

wherein R represents an alcohol group. The partially hydrolyzed species link to form M—O—M bonds by a polymerization or condensation reaction. Once polymerized, the solvent is evaporated and the body is then processed for use. These alkoxide processes are able to produce transparent glass bodies if the pore sizes are less than the wavelength of light. These transparent bodies may be weakly crystalline due to very small particle size.

Applications for the glass bodies made by alkoxide processing include nuclear fuel preparation, radioactive waste immobilization, preparation of ceramic powders, preparation of bulk glasses, glasses for coatings, optical fibers and the fabrication of glass-ceramics. High purity bulk glasses formed into plates have many possible applications, including the semiconductor industry. For example, silica glass bodies made from metal alkoxides are used as substrates for thin film transistors and integrated circuit masks.

Silica glass is one of the best known glass materials for semiconductor devices because it has good thermal stability, chemical durability and optical transparency over a wide range of wavelengths. A specific advantage of silica glass is the ease with which the chemical composition may be controlled. Alkali-free glass is especially useful for semiconductor substrates because alkali ions within the body of conventional soda lime plate glass substrates diffuse into the semiconductor materials deposited on the body of glass and change the doping gradient of the semiconductor material. This change has a negative effect on the efficiency, speed, and overall optical and chemical characteristics of the semiconductor device.

Sol-gel glass bodies have particular utility in the fabrication of amorphous silicon photovoltaic cells because they require substantially sodium free substrates are required to maintain peak efficiency of the conversion of sunlight into electricity. Sodium ions migrating from a conventional soda lime plate glass substrate into the semiconductor body material of a photovoltaic cell changes the doping profile of the semiconductor and consequently lowers the efficiency. Because each layer deposited in an amorphous silicon photovoltaic cell interacts with the anothers, compatibility is crucial. This special application requires a very smooth surface to enable effective conformal deposition of all layers. Conventional sol-gel processing yields glass bodies which are not sufficiently smooth for semiconductor applications.

Currently, silica glass bodies are formed by sol-gel processing. Gel glasses are formed from siliceous solids emulsified in a liquid solvent which then undergo a gelation solidification step, slowly and continuously increasing the viscosity of the gel. The solvent is slowly evaporated from the body, forming a block of silica glass having a porous structure. The silica glass is then sintered to collapse the pores to form a non-porous body. This sintered body is not sufficiently smooth on a microscopic level to be used for semiconductor applications because the collapsed pores cause textured surface defects. Although the textured surface defects are no longer jagged peaks after sintering, the height of the texture is still too great to receive depositions of layers of semiconductor material. Typically, to achieve the desired smoothness, the sintered plate is then polished and ground, which is an expensive and inefficient method.

U.S. Pat. No. 4,323,381 issued on Apr. 6, 1982 to Matsuyama et al., discloses a process for producing a mother rod useful for the production of an optical fiber which comprises hydrolyzing a silicon alkoxide to prepare a gel in the desired shape, and drawing and sintering the gel to produce a block made of silica glass. The dried gel is gently raised in temperature and then sinterd at the collapse temperature, but below the melting temperature of the dry gel.

Japanese Pat. No. 85-101,966/17 issued to Suwa Seikosha KK on Mar. 14, 1985 discloses a manufacture for a plate made by hydrolyzing methyl silicate to form silica sol, followed by gelation, drying and sintering. The stated improvement comprises the charging of silica into a vessel, rotating the vessel while situated at a preferred distance from the rotating sinter to be gelled, followed by drying and sintering. The advantage is a silica glass substrate of high quality which is produced simply by centrifugal force.

Japanese Patent No. 85-101,967/17 issued on Mar. 14, 1985 to Suwa Seikosha KK discloses a flat, plate-like silica glass manufactured from at least a metal alkoxide under low temperatures by the sol-gel process. The improvement comprises putting plate-like dry gel on the surface of a heat resisting board which is placed in parallel with the surface of the floor, followed by subjecting the plate to sintering. The sintering treatment is carried out by slowly heating the dry gel up to 1200 degrees Celsius. Disclosed is a product having flatness, as the plate-like gel is treated to avoid warping or bending. Plate-like silica glass obtained through this method is suitable for use as a substrate for thin film transistors or integrated circuit masks.

Polymerized metal alkoxides are acid catalyzed to form transparent gels which are uniform polymers; see, for example, *Sol-Gel Processing of Ceramics and Glass*, D. W. Johnson, Jr., American Ceramics Society Bulletin Vol. 64, Dec. 19, 1985, pages 1597–1602.

Tetraethylorthosilicate (TEOS), the ethoxide of silicon, is mixed with water and an acid catalyst to increase the rate of hydrolyzation to form a transparent gel. After drying, the silica body is sintered and polished by a spinning process. The body is then annealed at temperatures from 200° to 400° C.

SUMMARY OF THE INVENTION

The present invention provides a flat, plate-like sintered silica glass manufactured from at least a metal alkoxide under low temperature by a sol-gel process, the body having substantially parallel and oppositely facing surfaces formed by floating a sinter of the silica glass on a molten metallic bath. The bath includes at least one elemental metal and is maintained at a sufficiently high tempeature to heat polish the sintered body surface which is in thermal contact with the molten bath to form a substantially smooth planar surface. The glass body may be of a plate-like form made from a metal alkoxide, a silicate containing composition, or any other sol-gel composition.

The procedure of the invention is carried out by preparing a sol-gel and introducing it into a vessel having a predetermined shape which is similar to the shape of the desired glass body to be produced. The sol-gel is gelled and thereafter sintered to form a non-porous, roughly textured glass body of the predetermined shape. The sintered body is then floated on a molten metallic bath to provide the sintered body with a substantially smooth surface. The body may thereafter be cooled and annealed in preparation for further processing.

DETAILED DESCRIPTION

Figure 1A:
FIGS. 1a, 1b, 1c and 1d are a schematic representation of steps which may be practiced in carrying out an embodiment of this invention.

Referring to FIG. 1(a) of the accompanying drawings, a prepared sol-gel 10 is being introduced into vessel 12 which has a predetermined shape similar to the shape of the desired glass body to be produced. Sol-gel preparation 10 may be prepared in vessel 12 or in a separate container 16 prior to introduction into vessel 12. After gelling and drying, sol-gel 10 becomes semi-rigid to rigid and assumes the shape of vessel 12. The predetermined shape of vessel 12 may include plate-like forms, block forms, or any other shape which is suitable for floating on a molten metallic bath. Sol-gel 10 is gelled using any conventional gelation technique to produce a coherent state of matter capable of maintaining a particular shape.

Figure 1B:
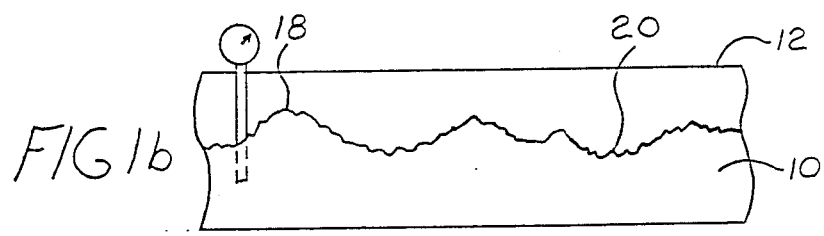

Referring now to FIG. 1(b) the sol-gel 10 may be exposed to the atmosphere and allowed to dry with or without the application of heat. Drying may be performed by slowly heating the sol-gel glass body to a temperature of about 100 degrees C. to 300 degrees C. under controlled conditions to prevent bubbling formation. The evaporation of water is preferably avoided during the gelling phase to minimize the possibility of cracking during the drying phase. Sol-gel 10, once dried, retains the shape of vessel 12, while providing a craggy surface due to the collapse of pores during drying. Sol-gel 10 exhibits roughly textured projections 18 and porous 20, having dimensions up to tens of thousands of angstroms in height and depth.

Figure 1C:
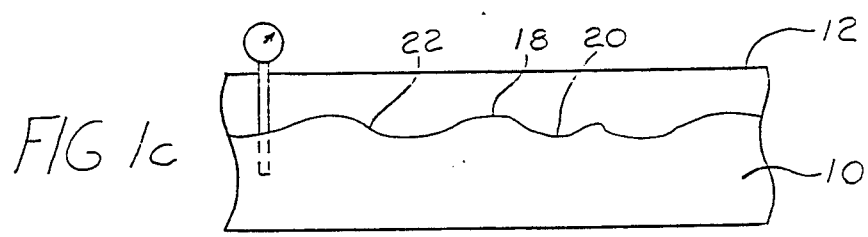

In FIG. 1(c), the illustration represents a sol-gel body 10 in a vessel 12 after sintering to provide a sintered surface 22. This is unsuitable for electronic applications because semiconductor materials, which are generally on the order of 1 micron in thickness, only deposit in the porous depressions 20, while depositing nonuniformly on projections 18. At best, depositions result in a nonconformal layer, which causes electronic shorts and other malfunctions.

After drying, the sol-gel glass body may be leached to remove a substantial portion of any alkali ions, particularly sodium, from within the body itself. Other sodium ion removal treatments may be effected. For certain applications, it is very undesirable to have sodium ions within the body.

The sintering may be accomplished by heating the glass body to a range of about 1000 to 1500 degrees C. Various gaseous environments may be utilized for the sintering, including air, nitrogen, helium, argon, xenon and oxygen. The sintering may also be performed first in a vacuum to further remove any liquid solvent remaining, and then in a gaseous environment as described above. Certain gaseous environments will also effect a sodium removal treatments.

Figure 1D:
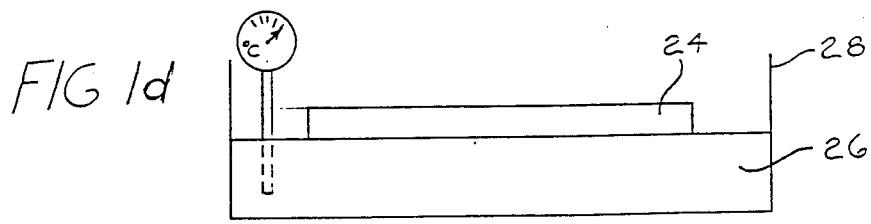

FIG. 1(d) illustrates sintered body 24 floating on molten metallic bath 26 in bath receptacle 28. Molten metallic bath 26 includes at least one elemental metal, such as tin, or any other suitable metal. Metallic bath 26 may also comprise more than one elemental metal. A metal may be selected for its reactivity with the composition of the sintered body. Tin may be selected in order to produce a tin oxide coating on the sintered body. Indium may also be included in the tin bath to provide a coating of indium tin oxide on the sintered body. Molten metallic bath 26 is maintained at a sufficiently high temperature to heat polish sintered body 24 to provide substantially smooth, planar surfaces suitable for further depositions of various materials.

While the best mode for carrying out the invention has been described in detail, those familiar with the art to which this invention relates will recognize alternative designs and embodiments for practicing the invention with the scope of the following claims.

What is claimed is:

1. In a method for producing silica glass, of the type wherein a sol-gel is prepared, gelled to from a silica glass, and sintered to form a non-porous, roughly textured glass, the improvement comprising floating the sintered silica glass on a molten metallic bath to provide the sintered silica glass with a substantially smooth, heat-polished planar surface.

2. A method as in claim 1, wherein said floating the sintered silica glass is accomplished by floating the sintered silica glass on a molten tin bath.

3. A method as in claim 1, further comprising drying the gelled silica glass by slowly heating the glass to a temperature of about 100° C. to 300° C. under controlled conditions, whereby bubble formation is substantially prevented.

* * * * *

UNITED STATES PATENT AND TRADEMARK OFFICE
CERTIFICATE OF CORRECTION

PATENT NO. : 4,769,058

DATED : September 6, 1988

INVENTOR(S) : Harold A. McMaster

It is certified that error appears in the above-identified patent and that said Letters Patent is hereby corrected as shown below:

In the Specification:

In column 2, line 42, please delete the word "sinterd" and insert in its place the word ---sintered---.

In column 3, line 26, please delete the word "tempeature" and insert in its place the word ---temperature---.

In column 4, line 14, please delete the word "causes" and insert in its place the word ---cause---.

In the Claims:

In claim 1, column 4, line 52, please delete the word "from" and insert in its place the word ---form---.

Signed and Sealed this

Twenty-eighth Day of February, 1989

Attest:

DONALD J. QUIGG

*Attesting Officer*  *Commissioner of Patents and Trademarks*